Patented Mar. 14, 1944

2,343,973

UNITED STATES PATENT OFFICE 2,343,973

ACID CONDENSATION PRODUCT OF FORMALDEHYDE AND ACID CONDENSATION POLYMERIZATION PRODUCT OF FURFURYL ALCOHOL AND METHOD FOR PREPARING THE SAME

Mortimer T. Harvey, South Orange, N. J., assignor to Harvel Research Corporation, a corporation of New Jersey No Drawing. Application February 24, 1943, Serial No. 476,969

18 Claims. (Cl. 260—67)

The present invention relates to the reaction product of formaldehyde with the acid condensation-polymerization products from furfuryl alcohol and the methods and steps of making and using the same.

In my application Serial No. 436,475 filed March 27, 1942, I have shown that furfuryl alcohol and formaldehyde may be reacted under certain conditions to produce a resinous product highly useful in the arts. It has been observed that reactions under acid conditions involving furfuryl alcohol generally have the difficulty that they are so violent as to make such reactions difficult of control. In my above mentioned application I have set forth certain conditions under which the uniting of furfuryl alcohol and formaldehyde can be done economically and advantageously.

I have now found that greatly improved qualities of final product and greatly enhanced yield of final product are made possible by converting the furfuryl alcohol to be used in the reaction into the polymerized condensation product of furfuryl alcohol which displays many characteristics to differentiate this product from furfuryl alcohol both chemically and physically.

I have found that by the use of the acid condensation-polymerization product from furfuryl alcohol it is possible to produce reaction products with formaldehyde and paraformaldehyde and other polymers of formaldehyde which may be set over to the hard, infusible condition with a minimum of gassing at the temperatures generally used in commercial molding. I have found that the intermediate fusible resins produced by my invention wherein the acid condensation-polymerization product from furfuryl alcohol is reacted with formaldehyde and the like can be produced according to the method of my present invention in greatly varying forms as to their viscosity from very light liquid resins to ropey and tacky resins and this control of viscosity I have found to be of great commercial advantage in preparing the intermediate resinous forms as, for example, by combining with fillers and the like preparatory to a final molding and hardening of these resins. I have found these intermediate products of my present invention of great commercial value in that it is possible to maintain them in the various stages of viscosity from very thin to very heavy for long continued times without their progressive hardening in storage. I have also found that these said intermediate resinous products can be varied as to their tackiness or stickiness which in many commercial processes wherein said resins are to be combined with other materials, is found to be of great advantage. These highly tacky intermediate products which are obtainable are advantageously used, for example, in extruding mixtures with asbestos for making brake linings and the like.

One of the advantages of the present invention resides in that the reaction product of formaldehyde and the acid condensation-polymerization product from furfuryl alcohol is more flexible and shows more impact strength than does the reaction product of furfuryl alcohol and formaldehyde. It has also been found that when the reaction product of furfuryl alcohol and formaldehyde is cured, or allowed to stand at room temperature, wrinkling occurs on the surface. When the acid condensation-polymerization product from furfuryl alcohol is used instead of furfuryl alcohol in reaction with formaldehyde according to my herein disclosed methods, it does not show this wrinkling and therefore gives a more desirable product unaffected during storage and the final product gives a better appearance for some purposes.

The hard infusible resin of this invention shows greater resistance to oxidizing acids, such as fuming sulfuric acid.

The acid condensation-polymerization product from furfuryl alcohol is clearly distinguishable from furfuryl alcohol not only in that the reaction product when these materials are condensed with formaldehyde display distinctly different properties, but the acid condensation-polymerization product from furfuryl alcohol is clearly distinguishable from furfuryl alcohol by other methods. As illustrative examples, the acid condensation-polymerization product from furfuryl alcohol is almost completely insoluble in water whereas furfuryl alcohol is readily soluble in water. The acid condensation-polymerization product from furfuryl alcohol is soluble with difficulty in alcohol whereas furfuryl alcohol is readily soluble in alcohol. The acid condensation-polymerization product from furfuryl alcohol has no definite boiling point whereas furfuryl alcohol boils at about 170° C. The acid condensation-polymerization product from furfuryl alcohol has a higher viscosity in all cases than does furfuryl alcohol and will vary in viscosity from a viscosity slightly greater than that of furfuryl alcohol to a viscosity wherein the product is a rubbery mass.

The products of the examples shown below in the method of making the acid condensation-polymerization product of furfuryl alcohol contain material which has a boiling point approximately the same as that of furfuryl alcohol but the percentage varies from zero to not over five percent. The acid condensation-polymerization product from furfuryl alcohol has a negligible fraction which will boil at 170° C. at atmospheric pressure and is soluble in water in contrast to furfuryl alcohol all of which boils at 170° C. As illustrative example, I have found in the examples herein shown that less than five per cent of the resulting product in any one of the Examples A to G inclusive, fulfilled these stated conditions as to boiling point and solubility in water, that is, a boiling point of about 170° C. and completely solubility in water.

The following examples illustrate methods of obtaining the acid condensation-polymerization product of my invention:

A. Five hundred grams of furfuryl alcohol and twenty-five grams of 80% lactic acid are heated together for one hour at approximately 95° C. to 110° C. Water is split off in this reaction and the product shows an increase of viscosity over the original furfuryl alcohol of 20% and it is insoluble in water, partially soluble in alcohol and completely soluble in acetone. The specific gravity of this reaction product is 1.150 at 25° C. Whereas the furfuryl alcohol has a boiling point below 170° C. at atmospheric pressure, a portion of the product of Example A completely neutralized, displayed no definite boiling point.

B. One thousand grams of furfuryl alcohol and fifty grams of 80% lactic acid were refluxed together for one-half hour at approximately 95° C. to 110° C. and then dehydrated while refluxing. Seventy cc. of water were removed within one hour. The specific gravity of the remaining product was 1.165 at 25° C. The viscosity at 25° C. was 50 centipoises. It was insoluble in water, completely soluble in acetone, only partially soluble in alcohol.

C. One thousand grams of furfuryl alcohol, fifty grams of formic acid (90%) were refluxed for one and one-half hours at approximately 95° C. to 110° C. and dehydrated to 150° C. in the open at atmospheric pressure. The viscosity of the finished product was 570 centipoises at 25° C. It was soluble in acetone, dissolved partially in alcohol with a high concentration of resin; separates with a high percentage of alcohol and is practically insoluble in petroleum spirits, soluble in aromatic solvents and insoluble in water. The specific gravity was 1.200 at 25° C.

D. One hundred pounds of furfuryl alcohol and six pounds of a 70% solution of hydroxy acetic acid, were boiled under a reflux condenser for two hours at approximately 105° C. The reaction product was partially dehydrated at atmospheric pressure and finally at reduced pressure until the temperature reached approximately 108° C. The mass was then cooled. The product was soluble in acetone, insoluble in water. It had a specific gravity of 1.23 at 25° C.

E. One hundred parts by weight of furfuryl alcohol, ten parts by weight of calcium chloride were brought to a point of ebullition under a reflux condenser at approximately 110° C. and so held until the viscosity was approximately 1000 centipoises. Water was added to stop the reaction and remove the calcium chloride and to greatly reduce the acidity. The pH value of the washed product was approximately 3.0. The resulting product was soluble in acetone and insoluble in water. The specific gravity was 1.21 at 25° C.

F. One hundred parts of furfuryl alcohol and one-half part of diethyl sulfate were heated under the same conditions as Example E, above. That is, when the reaction product reached a viscosity of approximately 1000 to 1500 centipoises the reaction was stopped by the addition of water. The product was insoluble in water, soluble in acetone, practically insoluble in alcohol and petroleum spirits and partially soluble in aromatic solvents. The pH value of the washed product was approximately 3.0.

G. To four hundred parts by weight of furfuryl alcohol there is added five cc. of a mixture of ten cc. sulfuric acid and ninety cc. of water: the five cc. were added and heat applied to start the reaction. When the reaction became vigorous, an equal volume of water was added and the acid-water mixture was removed by separating the resin which settled at the bottom. The residue was again treated with five cc. of the same sulfuric acid mixture and heat was again applied until the polymerization reached a stage where it has a viscosity of a rubbery mass. This mass was washed with water to partly neutralize the acidity. This rubbery mass was soluble in acetone, had a specific gravity of 1.25 at 25° C., was insoluble in water, insoluble in alcohol, and insoluble in petroleum spirits. The pH value of the washed product was approximately 3.0.

When conditions as to acidity are controlled, as illustrated in the above examples, so that the reaction takes place quietly, below the point of turbulence, at which the reaction, being exothermic, goes beyond control, that it is possible to predetermine the viscosity and other characteristics of the resulting acid reaction product. Acids and acid salts are equally satisfactory for use according to the method of my invention so long as the resulting acidity is kept below the point of uncontrollable exothermic reaction. By turbulent reaction I mean a reaction in which the original furfuryl alcohol of relatively low viscosity is converted into an infusible product without possibility of stopping at an intermediate relatively viscous fusible resinous stage.

These acid condensation-polymerization products from furfuryl alcohol range in viscosity from a stage not greatly removed from that of the original furfuryl alcohol to that of a rubbery mass. Each of these reaction products is insoluble in water and soluble in acetone.

The resulting products of Examples A to G, inclusive, were acidic and were left in that condition when reacted with formaldehyde as set forth below. It is possible to adjust the acidity of these products before reacting with formaldehyde if conditions require such adjustment.

In order to illustrate the methods of my invention, I have stated below illustrative examples as follows:

*Example 1.*—Fifty grams of the acid condensation-polymerization product from furfuryl alcohol according to Example A, above, were mixed with thirty grams of paraformaldehyde. The mixture was heated under reflux at approximately 108° C. and during this heating the paraformaldehyde was gradually taken up to form a clear mass. The reaction is exothermic and after one-half hour a heavy resin is obtained. This resin cures at 95° C. in 16 hours to a tough, high-impact material. The cured resin is substantially insoluble in acetone.

*Example 2.*—Fifty grams of the acid condensation-polymerization product from furfuryl alcohol according to Example A, above, and forty-one grams of 37% formaldehyde were heated under reflux condenser at approximately 100° C. for two hours. The resulting product was dehydrated under vacuum, yielding a viscous resin, capable of being cured by heating at 100° C. for 16 hours to a hard, infusible state.

*Example 3.*—To five hundred grams of the acid condensation-polymerization product from furfuryl alcohol according to Example B, above, four hundred seventeen grams of formaldehyde (37½% water solution) were added and the reaction was accomplished by heating at about 100° C. under reflux for one hour. The resulting product was then partially dehydrated under atmospheric pressure and finally under vacuum. The resin cured at 95° C. for 18 hours and showed excellent impact and flexibility. The surface of the resin cured without wrinkling.

*Example 4.*—One hundred grams of the acid condensation-polymerization product from furfuryl alcohol according to Example B, above, and fifteen grams of paraformaldehyde were heated under reflux at about 108° C. continually for one hour and dehydrated at 30 mm. pressure. The resulting resin cured in an oven at 95° C. to a hard, tough product, substantially insoluble in acetone.

*Example 5.*—One hundred grams of the acid condensation-polymerization product from furfuryl alcohol according to Example B, above, and thirty grams of paraformaldehyde were mixed and heated under reflux condenser for one hour at about 108° C. and then dehydrated under vacuum at 30 mm. pressure. The yield of resin was one hundred twenty grams of a very thick and tacky viscosity soluble in equal parts of alcohol. This resin was later cured to the hard infusible state without blow holes in 18 hours at 95° C. Substantially no loss in weight was observed during this final curing. The final cured resin was insoluble in acetone and alcohol whereas the intermediate product was soluble in acetone.

*Example 6.*—One hundred grams of the acid condensation-polymerization product from furfuryl alcohol according to Example C, above, and seven and one-half grams of paraformaldehyde were refluxed one hour at about 108° C. The resulting resinous product was cured at 100° C. to a rubbery mass in 20 hours, yielding a product practically insoluble in acetone.

*Example 7.*—One hundred grams of the acid condensation-polymerization product from furfuryl alcohol according to Example D, above, and one hundred grams of paraformaldehyde were mixed together and held at a temperature of approximately 60° C. for four days after which time it was found that the mass had been converted to an infusible state and was practically insoluble in acetone.

*Example 8.*—One hundred grams of the acid condensation-polymerization product from furfuryl alcohol according to Example E, above, and thirty grams of paraformaldehyde were mixed and placed in an oven at approximately 60° C. This was found to have been converted into an infusible mass which was practically insoluble in acetone in approximately five days.

*Example 9.*—One hundred parts of the acid condensation-polymerization product from furfuryl alcohol according to F, above, and eighty-five parts of 37½% water solution of formaldehyde were mixed and heated under reflux for one hour at 100° C. and then dehydrated under vacuum at 30 mm. pressure. The resulting fusible resin was found to cure into a hard infusible mass, practically insoluble in acetone, in approximately 16 hours at 95° C.

*Example 10.*—Twenty-five grams of the acid condensation-polymerization product from furfuryl alcohol according to G, above, and sixty grams of paraformaldehyde and twenty-five grams of wood flour were milled together on cold differential rolls. This gave a very fine, dry powder which was pressed together under 2500 pounds per sq. in. pressure at approximately 160° C. After one hour it was converted into a hard infusible unitary mass.

*Example 11.*—One hundred parts of the acid condensation-polymerization product from furfuryl alcohol according to G, above, and thirty parts of paraformaldehyde with eighty parts of wood flour were milled together on differential rolls. The mixture was then pressed together under 2500 pounds per sq. in. pressure and 160° C. for two hours to form a hard, tough mass.

For advantageous control of the reaction of Examples 1 to 11, inclusive, I have found that the acid conditions should be maintained at a degree of acidity less than that represented by 2 cc. of concentrated hydrochloric acid in 60 cc. of distilled water and for optimum, the pH value of the reaction mixture should be greater than one. The ratio of the quantity of acid condensation polymerization product to the quantity of formaldehyde employed in carrying out the invention may be between about 100 to 7½ and about 100 to 100.

Upon completion of the reactions disclosed in Examples 1 to 11, inclusive, it is sometimes advantageous to modify the acid conditions of the reaction product to make such conditions less acidic or alkaline.

An example to show the method of changing the pH value from the acid to the alkaline side is as follows:

Following the procedure of Example 3 to the point where the intermediate reaction product with formaldehyde has been dehydrated to the desired degree of viscosity, to one hundred parts of this finished intermediate resin, a solution of four parts by weight of sodium hydroxide in eight parts of water are added and stirred in. The temperature is allowed to rise and dehydration completed under vacuum. This product shows increased viscosity and cures slowly in an oven at 100° C. When additional hexamethylene tetramine or caustic is employed the speed of cure is decreased. A pH value of 14 may be employed. This resin so treated so as to be on the alkaline side may be used for the same purposes as those disclosed above, that is, with fillers for molding purposes and for coatings, and mixing with other resins to change their characteristics.

The intermediate products of the above Examples 1 to 11 inclusive, will be acidic in a degree commensurate with the strength of acid used in the reaction. I have found it advantageous when such intermediate products are to be stored for extended periods of time, to wash them with water, to neutralize them or add alkali to increase the pH to a value to no lower than approximately 3. I have also found it advantageous for certain purposes to treat such intermediate products so as to render them on the alkaline side.

The products of the present invention have characteristics which may them advantageous for use in impregnating sheets of fibrous material, for making laminations, and in making products which are molded under heat and pressure with or without the use of fillers. The products of the present invention are suitable as binders for asbestos, wood flour, slate dust, iron oxide, and other commercial fillers for molded products.

The products of the present invention are suitable both as binders and as fillers, either or both together, in brake linings and clutch facings for withstanding rapid changes in temperature and changes over wide ranges of temperature, and for withstanding high temperatures for prolonged periods of time.

The products of the present invention may be prepared in a widely varying degree of viscosity, ranging from relatively thin liquids to rubbery masses and to hard infusible masses. The thin liquids are especially suitable for use as binders for abrasive particles such as sand, emery, and carborundum in such manufactured articles as grinding wheels, emery cloth and sand paper.

In addition, the liquid reaction products of the present invention are suitable for the production of resinous castings.

The products of the present invention are suitable for making coating materials, for chemical resistant paints, for electrical insulation and for general protection.

The intermediate products of the present invention are suitable for incorporation with vinyl polymers and co-polymers such as products of vinyl acetate and vinyl buteral, vinyl chloride and acetals to produce useful products by incorporation with said polymers.

The intermediate products of the present invention are soluble in furfuraldehyde, in ketones, in certain proportions of alcohol and in mixtures of aromatic solvents, alcohols and acetone.

The intermediate products of the present invention are suitable for use with other resins, for example, lignin resins, phenol-formaldehyde resins and urea-formaldehyde resins for the purpose of varying the characteristics of such resins.

The intermediate products of the present invention are useful as solvents for phenol, cashew nut shell liquid and resins produced therefrom, such for example, as resins produced by condensation with formaldehyde and other aldehydes and reactive methylene group containing agents.

The intermediate products of the present invention can be milled into artificial rubber such as the poly-butadiene type and poly-chloroprene rubber, for example, for the purpose of increasing the oil resistance of the artificial rubber.

The intermediate viscous reaction products of the present invention are suitable for use in combination with lignin resins. Various kinds of lignins may be so used. For example, the lignin and tannic acids present in the redwood trees. If this wood is ground to a fine powder and if one hundred parts of it and one hundred parts, for example, of the acid condensation-polymerization product from furfuryl alcohol according to Example G, above, and twenty parts of paraformaldehyde are milled together, they may be cured at 2500 pounds per sq. in. pressure at 160° C. in five mintes to yield a hard resinous product useful in the arts. Lignin from the paper mills which has been extracted with alkali and is therefore water soluble because of the sodium radicle present, may also be used to react with the intermediate products of the present invention, for example as follows:

One hundred parts of wood flour, one hundred twenty parts of the intermediate product of Examples 1 to 11, five parts of zinc stearate and thirty parts of water-soluble lignin resin milled together and molded at 2500 pounds per sq. in. pressure and at 160° C. were found to yield a molded product of good strength and homogeneity. Curing times may be made as low as 1¼ minutes.

An example utilizing water insoluble lignin is as follows:

Sixty parts of the acid condensation-polymerization product from furfuryl alcohol according to Example A, above, forty parts of water-insoluble lignin, and twenty parts of paraformaldehyde were mixed together and heated until a viscous mass was obtained. This mixture cured in one-half hour at 100° C. to a hard infusible mass.

Having thus described my invention, what I claim and desire to protect by Letters Patent is:

1. A resin obtained by reacting under acid conditions wherein the pH value is not less than that obtained in a solution of two cc. of concentrated hydrochloric acid in sixty cc. of distilled water, formaldehyde and a fusible acid condensation-polymerization product of furfuryl alcohol.

2. The method which comprises heating together an acidic mixture whose pH is not less than 1 and comprising an acidic agent, formaldehyde and a fusible acid condensation-polymerization product of furfuryl alcohol.

3. The method which comprises heating together an acidic mixture whose pH is not less than 1 and comprising formaldehyde, a fusible acid condensation-polymerization product of furfuryl alcohol and hydroxy acetic acid.

4. The method which comprises heating together an acidic mixture whose pH is not less than 1 and comprising formaldehyde, a fusible acid condensation-polymerization product of furfuryl alcohol and lactic acid.

5. A method of treating a fusible acid condensation-polymerization product of furfuryl alcohol, such product being characterized in that it is only partially soluble in ethyl alcohol, comprising heating a mixture whose pH is no less than about 1 and comprising an acidic agent, said product and formaldehyde until there is produced an intermediate reaction product with increased solubility in ethyl alcohol.

6. The method which comprises condensing a mixture whose pH is not less than that obtained in a solution of 2 cc. of concentrated hydrochloric acid in 60 cc. of distilled water and comprising an acidic agent, one hundred parts by weight of a fusible acid condensation-polymerization product of furfuryl alcohol and from seven and one-half to one hundred parts of formaldehyde.

7. The method comprising under acidic conditions wherein the pH is not less than that obtained in a solution of 2 cc. of concentrated hydrochloric acid in 60 cc. of distilled water reacting formaldehyde with a fusible acid condensation-polymerization product of furfuryl alcohol.

8. The method comprising reacting of formaldehyde with an acid condensation-polymerization product of furfuryl alcohol under acid conditions represented by a pH value not less than that indicated in a solution of two cc. of hydrochloric acid in sixty cc. of distilled water, said acid condensation-polymerization product being produced under acid conditions represented by a pH value not less than that indicated in a solution of ten cc. sulphuric acid (conc.) in ninety cc. distilled water.

9. The method comprising reacting a fusible acid condensation-polymerization product of furfuryl alcohol with formaldehyde under acid conditions represented by a pH value of not less than one, said acid condensation-polymerization product being produced under acid conditions represented by a pH value of not less than one and then increasing the pH of the reaction product produced.

10. The method comprising the reaction of formaldehyde with the acid condensation-polymerization product of furfuryl alcohol under acid conditions represented by a pH value of not less than one, said acid condensation-polymerization product being produced under acid conditions represented by a pH value of not less than one and then adding an alkaline material to bring the reaction product to a pH value of between approximately three and one-half to fourteen.

11. The method comprising heating an acidic mixture whose pH is not less than about 1 and comprising about 100 parts by weight of a fusible acid condensation-polymerization product of furfuryl alcohol, between seven and one-half to one hundred parts by weight of formaldehyde and an acidic agent and then increasing the pH of the product produced.

12. The method comprising heating an acidic mixture whose pH is not less than about 1 and comprising about 100 parts by weight of a fusible acid condensation-polymerization product of furfuryl alcohol, between seven and one-half to one hundred parts by weight of formaldehyde and an acidic agent and then increasing above about 3 the pH of the product produced.

13. The method comprising heating at approximately refluxing temperature an acidic mixture whose pH is not less than about 1 and comprising an acidic agent, formaldehyde and a fusible acid condensation-polymerization product of furfuryl alcohol, the ratio of the quantity by weight of said condensation-polymerization product of furfuryl alcohol to the quantity by weight of said formaldehyde in said mixture being between about 100 to 7½ and 100 to 100.

14. The method comprising heating at approximately refluxing temperature an acidic mixture whose pH is not less than about 1 and comprising an acidic agent, formaldehyde and a fusible acid condensation-polymerization product of furfuryl alcohol, and then increasing the pH of the product produced to a value above about 3, the ratio of the quantity by weight of said condensation-polymerization product of furfury alcohol to the quantity by weight of said formaldehyde in said mixture being between about 100 to 7½ and 100 to 100.

15. A product obtained by the method of claim 6.

16. A product obtained by the method of claim 8.

17. A product obtained by the method of claim 13.

18. A product obtained by the method of claim 14.

MORTIMER T. HARVEY.